United States Patent
Choi et al.

(10) Patent No.: US 7,655,335 B2
(45) Date of Patent: Feb. 2, 2010

(54) AIR BREATHING DIRECT METHANOL FUEL CELL PACK

(75) Inventors: Kyoung Hwan Choi, Kyungki-do (KR); Hyuk Chang, Kyungki-do (KR)

(73) Assignee: Samsung SDI Co., Ltd. (KR)

( * ) Notice: Subject to any disclaimer, the term of this patent is extended or adjusted under 35 U.S.C. 154(b) by 373 days.

(21) Appl. No.: 10/259,291

(22) Filed: Sep. 30, 2002

(65) Prior Publication Data
US 2003/0180594 A1 Sep. 25, 2003

(30) Foreign Application Priority Data
Mar. 20, 2002 (KR) .................... 2002-0015116

(51) Int. Cl.
H01M 8/10 (2006.01)
H01M 8/02 (2006.01)
H01M 2/04 (2006.01)

(52) U.S. Cl. .................... 429/34; 429/30; 429/32; 429/38

(58) Field of Classification Search ............... 429/30, 429/32, 33, 34, 35, 38, 41, 42, 158, 162
See application file for complete search history.

(56) References Cited

U.S. PATENT DOCUMENTS

| | | | |
|---|---|---|---|
| 4,722,773 A * | 2/1988 | Plowman et al. ............ 205/525 |
| 5,861,221 A | 1/1999 | Ledjeff et al. | |
| 5,925,477 A | 7/1999 | Ledjeff et al. | |
| 5,945,232 A * | 8/1999 | Ernst et al. ............... 429/32 |
| 6,030,718 A * | 2/2000 | Fuglevand et al. ............ 429/26 |
| 6,127,058 A * | 10/2000 | Pratt et al. ................ 429/30 |
| 6,268,077 B1 | 7/2001 | Kelley et al. | |
| 6,458,479 B1 * | 10/2002 | Ren et al. ................. 429/33 |
| 6,743,541 B2 * | 6/2004 | Chang et al. ............... 429/30 |
| 6,986,961 B1 * | 1/2006 | Ren et al. ................. 429/38 |
| 2004/0197633 A1 * | 10/2004 | Yamamoto et al. ............ 429/34 |

FOREIGN PATENT DOCUMENTS

EP    1 134 830 A2    9/2001

(Continued)

OTHER PUBLICATIONS

Official English Translation of WO 01/67532 Published Sep. 13, 2001.*

(Continued)

Primary Examiner—Robert Hodge
(74) Attorney, Agent, or Firm—Cantor Colburn LLP

(57) ABSTRACT

An air breathing direct methanol fuel cell pack includes: a membrane electrode assembly (MEA) including single cells having an electrolyte membrane, anodes on a first plane of the electrolyte membrane and cathodes on a second plane thereof, the second plane disposed opposite to the first plane; a fuel supply unit facing the first plane; an upper panel member facing the second plane of the MEA and including a first cavity and second cavity, a plurality of air vent holes formed in the first and/or second cavity and air channels connecting the first and second cavities; current collectors disposed on the cathode and anode of single cells of the MEA; conductors electrically connecting the current collectors to form electric circuitry among the single cells; and a lower panel member for forming a housing for accommodating the MEA and the fuel supply unit in cooperation with the upper panel member.

41 Claims, 12 Drawing Sheets

FOREIGN PATENT DOCUMENTS

| | | |
|---|---|---|
| JP | 02-234358 | 9/1990 |
| JP | 05-041221 A | 2/1993 |
| JP | 10-513600 A | 12/1998 |
| JP | 2000-268835 * | 9/2000 |
| JP | 2000268835 | 9/2000 |
| JP | P2000-268835 A | 9/2000 |
| JP | P2000-268836 A | 9/2000 |
| JP | 2001-273914 | 10/2001 |
| JP | 2001-283892 | 10/2001 |
| JP | P2002-015763 A | 1/2002 |
| WO | 01-45189 A1 | 6/2001 |
| WO | WO 0167532 A1 * | 9/2001 |
| WO | 01-97314 A1 | 12/2001 |
| WO | 02/099916 A2 | 12/2002 |

OTHER PUBLICATIONS

European Search Report issued by the European Patent Office on Aug. 19, 2004 in corresponding application 02021512.5-1215.
Notice to submit response issued by the Korean Patent Office on Sep. 2, 2004 in corresponding application 10-2002-0015116.
Official Action issued by the Japanese Patent Office in corresponding JP Patent Application No. 2003-014898 on Sep. 5, 2006.

* cited by examiner

AIR BREATHING DIRECT METHANOL FUEL CELL PACK

CROSS-REFERENCE TO RELATED APPLICATIONS

This application is based upon and claims priority from Korean Patent Application No. 2002-15116 filed Mar. 20, 2002, the contents of which are incorporated herein by reference.

BACKGROUND OF THE INVENTION

1. Field of the Invention

The present invention relates to a cell pack of a direct methanol fuel cell for use as power of portable electronic devices, and more particularly, to an air breathing direct methanol fuel cell pack with an effective air supply unit.

2. Description of the Related Art

A direct methanol fuel cell (DMFC), which generates electrical power by electrochemical reactions between methanol as fuel and oxygen as an oxidizing agent, has a high energy density and a high power density. Also, since the DMFC uses methanol directly as a fuel, external peripheral devices such as a fuel reformer are not required and the fuel is easily stored and supplied. Further, a monopolar DMFC can be operated at room temperature and atmospheric pressure and can be made lightweight and miniaturized, thus having very wide applications including mobile communications equipment such as mobile cellular phones, PDAs or laptop computers, medical appliances, military equipment and so on.

As described above, DMFCs produce electricity by electrochemical reaction between methanol and oxygen. A single cell of such DMFCs is constructed such that an electrolyte membrane is interposed between an anode and a cathode.

Both of the anode and cathode include a fuel diffusion layer for supply and diffusion of fuel, a catalyst layer at which electrode reactions, that is, oxidation/reduction of fuel, occur, and electrode backings.

As the catalyst layer for oxidation/reduction, precious metals having good characteristics even at low temperatures, such as platinum (Pt), are used, and alloys of transition metal such as ruthenium (Ru), rhodium (Rh), osmium (Os) or nickel (Ni) can also be used for preventing catalytic poisoning due to reaction byproducts, e.g., carbon monoxide. Carbon paper or carbon cloth is used as the electrode backings, and the electrode backings are waterproof for easy supply of fuel and easy exhaustion of reaction products. The polymer electrolyte membrane has a thickness of 50 to 200 pm. A proton exchange membrane having ionic conductivity is usually used as the electrolyte membrane.

The following reaction equations occur in the anode where fuel is oxidized and the cathode where oxygen is reduced, respectively.

Anode Reaction

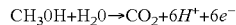
$$CH_3OH + H_2O \rightarrow CO_2 + 6H^+ + 6e^-$$

Cathode Reaction

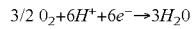
$$3/2\ O_2 + 6H^+ + 6e^- \rightarrow 3H_2O$$

Overall Reaction

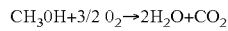
$$CH_3OH + 3/2\ O_2 \rightarrow 2H_2O + CO_2$$

In the anode, carbon dioxide, six protons and six electrons are generated by reaction between methanol and water, that is, oxidation, and the generated protons are transferred to the cathode via the proton exchange membrane. In the cathode, protons and electrons supplied from an external circuit react with oxygen to produce water, that is, reduction. Thus, the overall reaction corresponds to reaction between methanol and oxygen to produce water and carbon dioxide.

A theoretical voltage generated in a DMFC single cell is approximately 1.2 V. However, the open circuit voltage under room temperature and atmospheric pressure conditions is 1 V or less and an actual operation voltage is approximately 0.3 to 0.5 V because there is a voltage drop due to activation overpotential and resistance over-potential. Thus, in order to generate a desirably high voltage, several single cells are stacked and electrically connected in series. The method stacking single cells in series is largely classified as a bipolar stack type and a monopolar cell pack type. The bipolar stack type is configured such that a single separator has both a positive (+) polarity and a negative (−) polarity and is suitably used for high power capacity. The monopolar cell pack type is configured such that a single separator has only a positive (+) or a negative (−) polarity and is suitably used for low power capacity.

According to the monopolar cell pack type, a plurality of single cells are arranged on an electrolyte membrane and then the respective single cells are connected in series, thereby considerably reducing the thickness and volume of fuel cell stack, realizing a lightweight, small-sized DMFC. In the monopolar cell pack type, the electrodes on the electrolyte membrane have all the same polarity, allowing fuel to be simultaneously supplied to all electrodes, thereby advantageously maintaining fuel concentrations of all the electrodes at a constant level.

However, in the monopolar cell pack, unlike the bipolar stack in which fuel supply and electrical connection are simultaneously established due to many graphite blocks each serving as a current collector and having a fuel flow field as a fuel supply path, it is difficult to simultaneously establish fuel supply and electrical connection. For this reason, when the contact between the current collector and anode or cathode is bad and a contact area is not wide, a current loss is generated due to contact resistance. Also, since efficient exhaustion of carbon dioxide, a reaction byproduct, is difficult to achieve, carbon dioxide bubbles permeate into a liquid fuel layer, thereby impeding fuel supply, and the bubbles produced on the electrode surface prevents fuel from moving to the catalyst layer, thereby noticeably deteriorating performance of electrodes.

To solve such drawbacks, a current collector plate enabling simultaneous fuel supply and current collection is necessary and such a current collector plate should be configured to maximize a contact area between the current collector plate and an electrode, thereby preventing a current loss due to contact resistance. Also, it is necessary to cause rapid exhaustion of carbon dioxide existing at the electrode surface by installing an appropriate exhaust path of carbon dioxide, thereby allowing fuel to be smoothly supplied to the catalyst layer.

Since a DMFC uses oxygen as a reactant gas, a DMFC cell pack should be configured such that its cathode for reduction directly contacts external air. However, when a DMFC cell pack is mounted on an electronic device to be used as a power source of the electronic device, an air inlet port formed on the external surface of the cell pack may be partially shielded at a connected area between the cell pack and the electronic device or the air inlet port may be shielded by user's body or according to use surroundings of the electronic device. In this case, since oxygen is not properly supplied to the shielded portion, electrode reactions do not occur thereat.

To overcome the problem, it is necessary to provide a cell pack having a structure capable of fully inducing external air into the structure to be evenly supplied to electrode surfaces, irrespective of a connected area between the cell pack and the electronic device or use surroundings of the electronic device. Also, separate means for preventing infiltration of external foreign matter or moisture must be provided.

SUMMARY OF THE INVENTION

It is a first object of the present invention to provide a direct methanol fuel cell (DMFC) capable of smoothly supplying air into a cell pack and having a maximized contact area with external air.

It is a second object of the present invention to provide a direct methanol fuel cell pack which can effectively supply air and can effectively suppress induction of external foreign matter.

These and other objects of this invention are addressed by an air breathing direct methanol fuel cell pack comprising: a membrane electrode assembly (MEA) forming a plurality of single cells having an electrolyte membrane, a plurality of anodes on a first plane of the electrolyte membrane and a plurality of cathodes on a second plane of the electrolyte membrane correspondingly to the anodes, the second plane being opposed to the first plane, fuel supply unit facing the first plane of the MEA and supplying liquid fuel to the anodes on the first plane of the MEA, an upper panel member facing the second plane of the MEA and having a plurality of air vent holes through which air passes and a plurality of air channels for mutually connecting inner parts of the air vent holes, the air channels formed at the internal surface facing the MEA, current collectors provided on the cathode and anode of each unit cell in the MEA, conductors electrically connecting the current collectors to form electric circuitry among the unit cells, and a lower panel member for forming a housing for accommodating the MEA and the fuel supply unit in cooperation with the upper panel member.

In accordance with another aspect of the present invention, there is provided an air breathing direct methanol fuel cell pack comprising a fuel supply unit in which liquid fuel is accommodated and having fuel supply plates disposed at either side thereof to allow the liquid fuel to pass, a set of membrane electrode assemblies (MEAs) provided at both sides of the fuel supply unit and forming a plurality of single cells having an electrolyte membrane, a plurality of anodes on the internal surface of the electrolyte membrane, the internal surface facing the fuel supply unit and a plurality of cathodes on the external surface of the electrolyte membrane correspondingly to the anodes, current collectors provided on the cathode and anode of each single cell in the MEAs, conductors electrically connecting the current collectors to form electric circuitry among the single cells, upper and lower panel members facing the external surfaces of the respective MEAs having a plurality of air vent holes through which air communicates outside, the upper and lower panel members forming a housing for accommodating various parts of the cell pack including the MEAs and the fuel supply unit, and a plurality of air channels for mutually connecting inner parts of the air vent holes formed at the internal surfaces of at least one of the upper and lower panel members, the air channels formed at the internal surface of the corresponding panel member.

In another aspect of the present invention, the plurality of air channels are formed on the internal surface of the corresponding panel member in parallel in a furrow pattern or check pattern.

According to still another aspect of the present invention, the air vent holes are formed at two opposite areas separated from each other around the center of the upper panel member, and the air channels are formed in a direction in which the two areas are connected to each other.

Alternatively, cavities may be formed at the internal surfaces of the two opposite areas where the air vent holes are formed and connect the air vent holes formed thereat, and the air channels may be formed at the internal surface of the corresponding panel member in either a furrow pattern or a check pattern.

Also, a membrane for preventing infiltration of external moisture may be provided between the upper panel member and the MEA corresponding to the upper panel member and/or between the lower panel member and the MEA corresponding to the lower panel member. The current collector installed on the cathode and the anode may be formed of a metal mesh to allow passage of air and liquid fuel.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
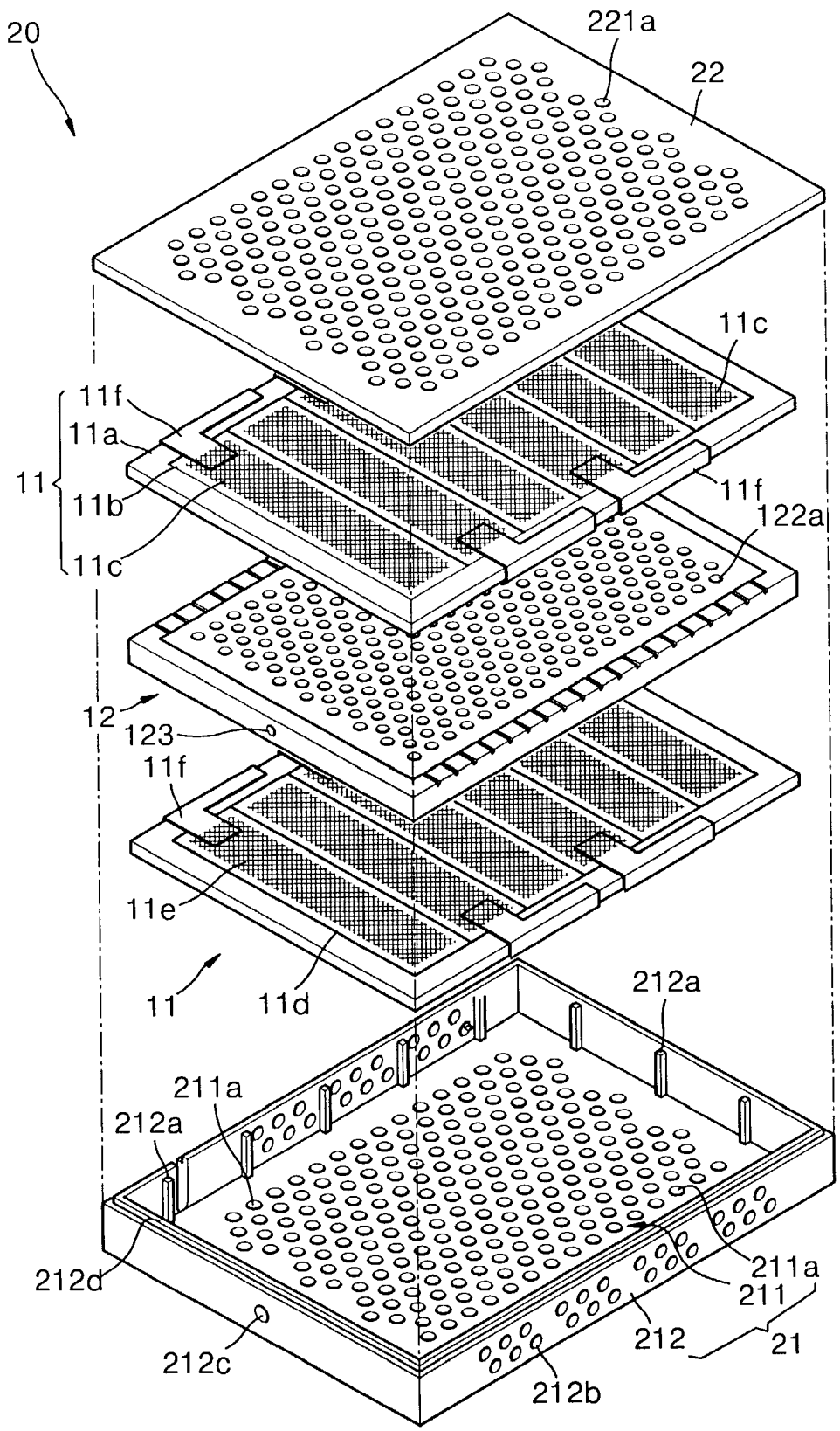
FIG. 1 is a schematic development diagram illustrating components an air breathing direct methanol fuel cell pack according to a first embodiment of the present invention.
Figure 2:
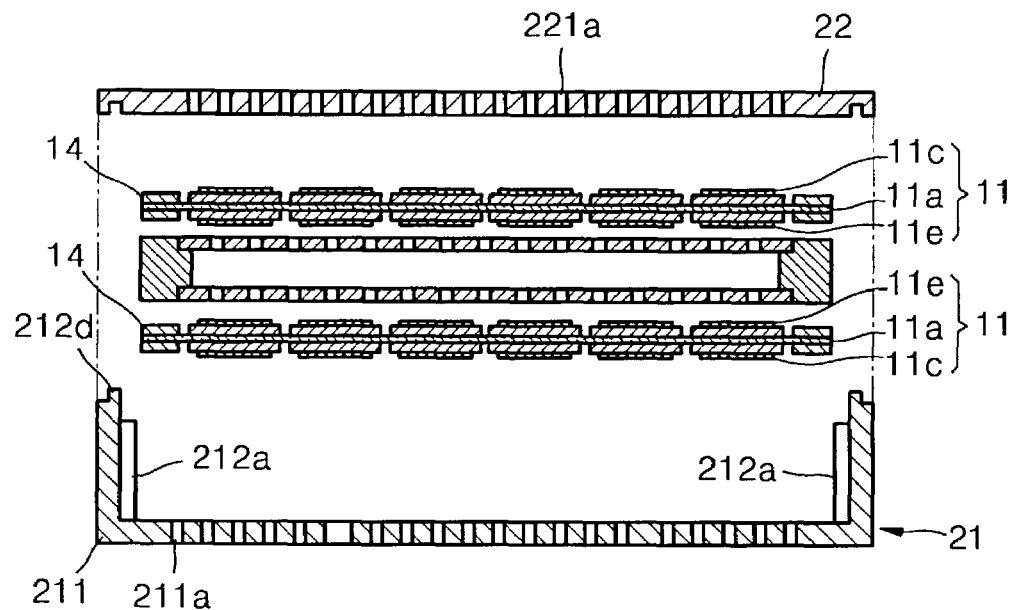
FIG. 2 is a cross-sectional development diagram illustrating the stack structure of the air breathing direct methanol fuel cell pack shown in FIG. 1.

Referring to FIGS. 1 and 2, a pair of membrane electrode assemblies (MEAs) 11 for producing electricity by methanol and air supply are symmetrically disposed in the upper and lower portions of a hexahedral fuel supply unit 12 having a fuel inlet port 123 at one side thereof.

The MEAs 11 and the fuel supply unit 12 disposed at the center thereof are accommodated inside a hexahedral housing 20. The housing 20 includes a lower body 21 having a lower panel member 211 having a plurality of air vent holes 211a and a wall body 212 formed along the perimeter of the lower panel member 211 to a predetermined height, and an upper panel member 22 being in contact with the top end of the wall body 212 to cover the lower body 21 and having a plurality of air vent holes 221a, thus forming the housing 20. Spacers 212a and gas exhaust holes 212b for providing an exhaust path of carbon dioxide gas generated at an anode 11d facing the fuel supply unit 12 are formed on the internal surface of the wall body 212 with a gap provided between the lateral surface of the fuel supply unit 12 and the internal surface of the wall body 212. A projection 212d corresponding to a fitting groove (not shown) formed on the bottom surface of the upper panel member 22 is provided on the top end of the wall body 212, thereby promoting a secured connection between the upper panel member 22 and the lower body 21. A throughhole 212c corresponding to the fuel inlet port 123 of the fuel supply unit 12.

Each of the MEAs 11 provided at the upper and lower portions of the fuel supply unit 12 includes an electrolyte layer 11a, and a plurality of the anodes 11d and a plurality of cathodes 11b, provided on first and second planes of the electrolyte layer 11a, respectively. Mesh-type current collectors 11e and 11c contact surfaces of the anodes 11d and cathodes 11b of the plurality of cathodes 11b, respectively. A plurality of conductors 11f electrically connecting the current collector 11c of a cathode 11b with the current collector 11e of an anode 11d, of a single cell, are provided at edges of the electrolyte layers 11a.

The fuel supply unit 12 having the fuel inlet port 123 is a hexahedral container for storage of fuel, that is, methanol, and includes a plurality of fuel supply holes 122a on the upper and lower surfaces thereof. The configuration of the fuel supply unit 12 will later be described in more detail.

Basic structures of a cell pack will first be described.

Figure 3:
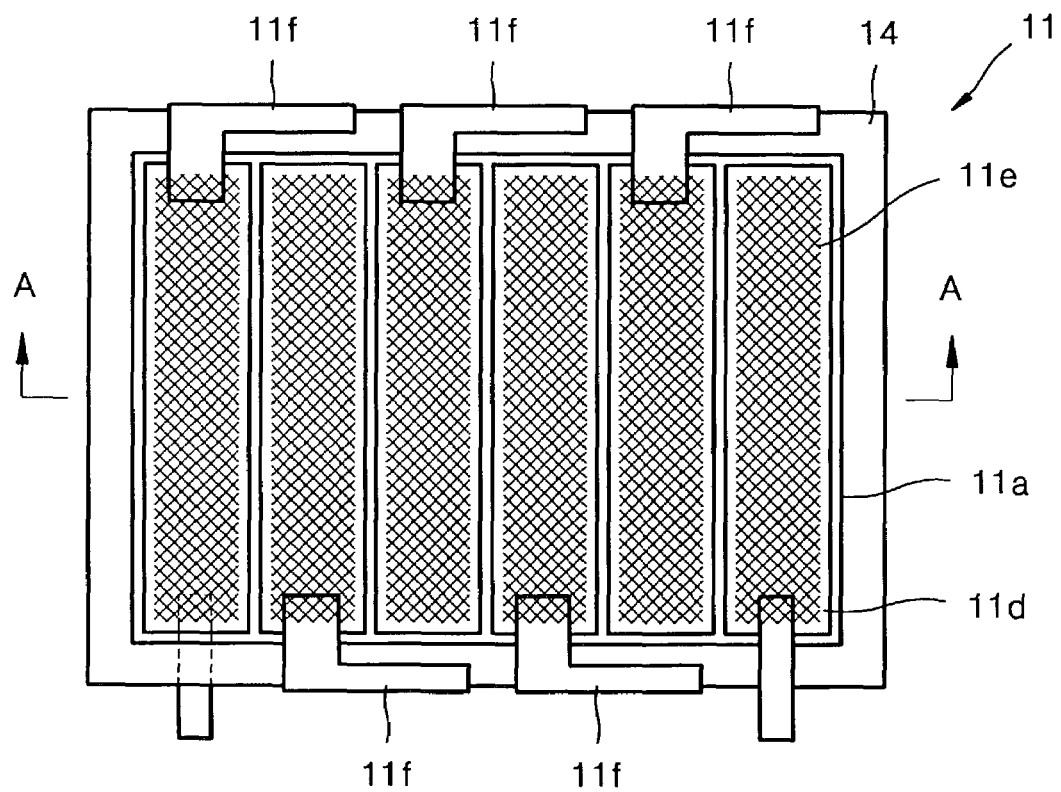
FIG. 3 is a plan view illustrating a membrane electrode assembly (MEA) employed in the air breathing direct methanol fuel cell pack according to the present invention.
Figure 4:
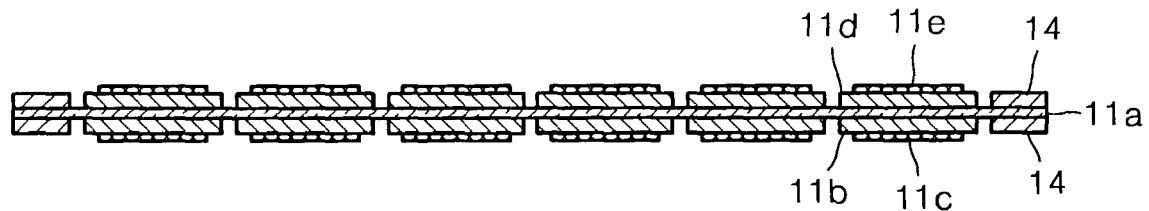
FIG. 4 is a cross-sectional view of the structure shown in FIG. 3, taken along the line A-A.

FIG. 3 is a plan view of the anode 11d of each of the MEAs 11 shown in FIGS. 1 and 2, and FIG. 4 is a cross-sectional view of FIG. 3, taken along the line A-A, in which the mesh-type current collector 11e is exploded and shown. As shown in FIGS. 3 and 4, a rectangular flange gasket 14 is provided at each of front and back surfaces of the edges of the electrolyte layer 11a. The gasket 14 is made of TEFLON® (polytetrafluoroethylene or "PTFE") coated with silicon having good elasticity and adhesiveness. The gasket 14 is not shown in FIG. 1, for brevity's sake. For the purpose of preventing leakage of methanol supplied from the fuel supply unit 12 to the anode 11d, the gasket 14 is formed at the edges of the upper and lower surfaces of each of the MEAs 11.

Figure 5:
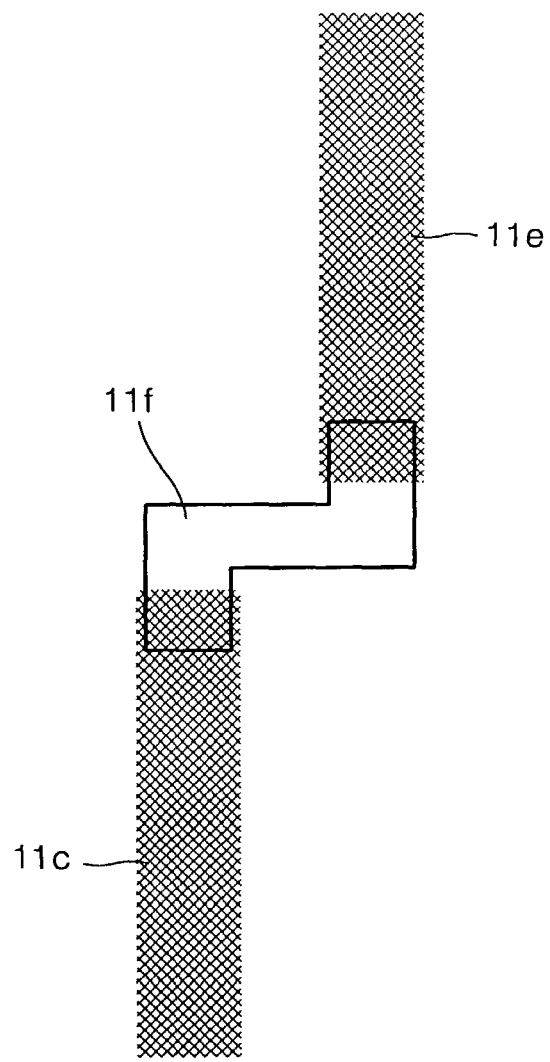
FIG. 5 is a plan view illustrating a current collector employed in the air breathing direct methanol fuel cell pack according to the present invention, and a conductor connecting the current collector to the cell pack.

Six sets of anode and cathodes 11d and 11b, respectively, are symmetrically fixed on both surfaces of the electrolyte layer 11a. In other words, six anodes 11d are arranged on one plane of the electrolyte layer 11a at a predetermined distance, e.g., 1 mm, and six cathodes 11b are arranged on the other plane of the electrolyte layer 11a at a predetermined distance, e.g., 1 mm, thereby forming six single cells. The mesh-type current collectors 11e and 11c are positioned on the anode and cathodes 11d and 11b, respectively. As shown in FIG. 5, the mesh-type current collectors 11e and 11c are connected to the conductors 11f.

The conductors 11f electrically connect in series six unit cells each provided by a set of an anode 11d and a cathode 11b, thereby constituting an electrical circuit, which is generally known in the art and an explanation thereof will not be given herein.

In order to prevent an increase in resistance due to corrosion, the conductors 11f and the current collectors 11e and 11c are preferably formed of metal having good corrosion resistance, e.g., Ni or Pt. In this embodiment, Ni mesh coated with gold (Ag) and Cu foils are used as the current collectors and conductors, respectively. The current collectors 11e and 11c have a thickness of approximately 50 μm and a sufficiently high aperture ratio, thereby facilitating passage of methanol as liquid fuel.

Figure 6:
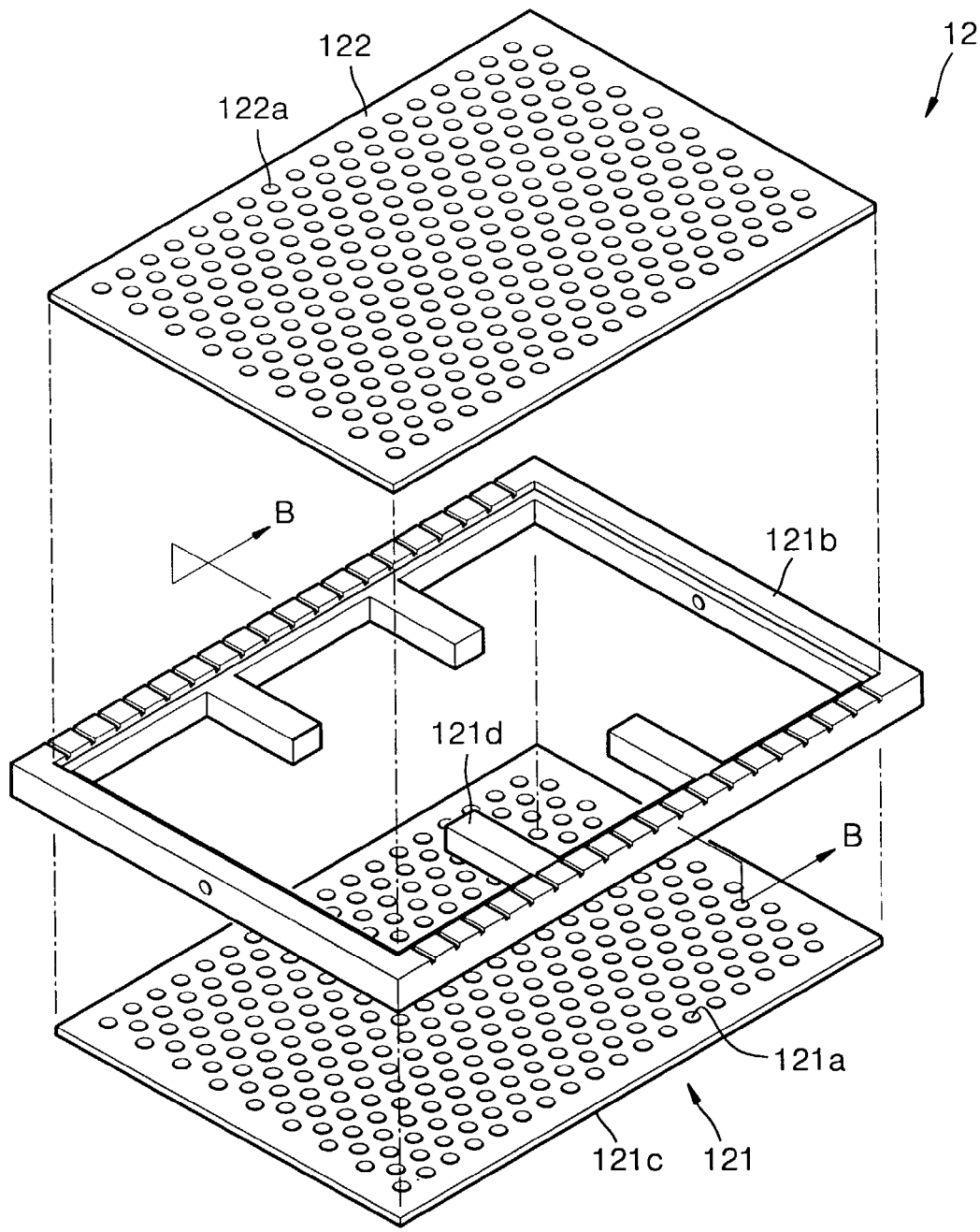
FIG. 6 is an exploded perspective view of the air breathing direct methanol fuel cell pack shown in FIG. 1.
Figure 7:
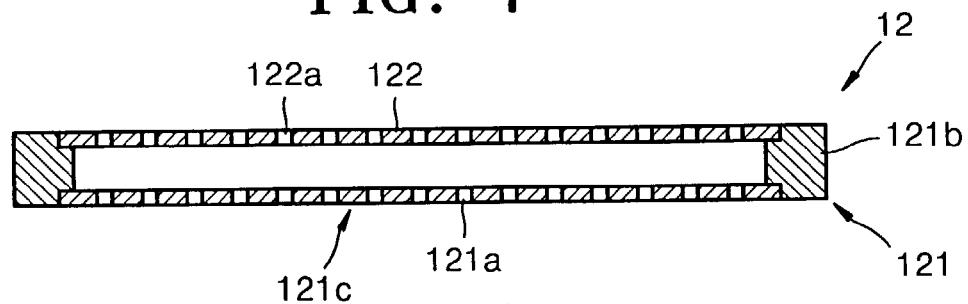
FIG. 7 is a schematic cross-sectional view illustrating the internal structure of a fuel supply unit shown in FIG. 6.

FIG. 6 is an exploded perspective view of the fuel supply unit 12, and FIG. 7 is across-sectional view of FIG. 6, taken along the line B-B. As shown in FIGS. 6 and 7, the fuel supply unit 12 includes a lower body 121 and an upper fuel supply plate 122 connected to the top portion of the lower body 121 and having a plurality of the fuel supply holes 122a, the lower body 121 having a flange portion 121b of a predetermined height and a lower fuel supply plate 121c. Methanol is accommodated in the fuel supply unit 12, and the MEAs 11 are closely adhered to outer surfaces of the upper and lower fuel supply plates 122 and 121c, respectively. The upper and lower fuel supply plates 122 and 121c, respectively, are members for supplying fuel using a capillary force. Thus, a small quantity of methanol in the fuel supply unit 12 is continuously supplied to the anodes 11d of the MEAs 11 through the fuel supply holes 122a of the upper fuel supply plate 122 and through fuel supply holes 121a of the lower fuel supply plate 121c. In FIG. 6, reinforcement ribs 121d serve as spacers for supporting the upper fuel supply plate 122 by tightening the central portion of the upper fuel supply plate 122.

The above-described cell pack will now be described in detail. The cell pack is constructed such that the MEAs 11 are symmetrically installed to closely contact the lower and upper fuel supply plates 121*c* and 122, respectively, of the fuel supply unit 12. This structure is housed in the housing 20 including the lower body 21 and the upper panel member 22, the lower body 21 having the plurality of air vent holes 211*a* and the wall body 212 formed along the perimeter of the lower panel member 211, and the upper panel member 22 being shaped of a plate and having the plurality of air vent holes 221*a*.

In such a construction, methanol is supplied from the fuel supply unit 12 between the MEAs 11 within the housing 20, and air, i.e., oxygen, is supplied through the air vent holes 221*a* and 211*a* provided at the upper and lower panel members 22 and 211, respectively, disposed at the upper and lower portions of housing 20. As described above, methanol is supplied to the anode side and air is supplied to the cathode side.

The present invention features that there is provided an air supply unit, which will be described below. The air supply unit featuring the cell pack according to the present invention includes an air supply path capable of evenly supplying air throughout the cathodes 11*b* even when a portion of the housing 20 is shielded, for example, when some of air vent holes 221*a* and/or 221*a* are shielded by a user's hand, like in the case where the cell pack is applied to a mobile phone.

Such an air supply unit is provided at the above-described upper panel member 22 and/or lower panel member 221.

Figure 8:
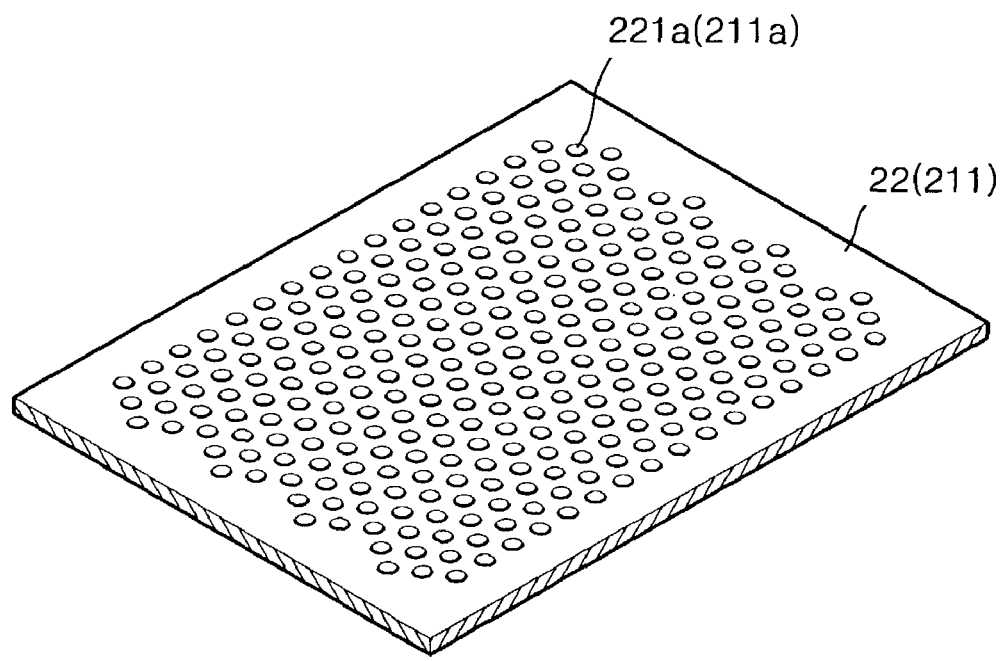
FIG. 8 is a perspective view illustrating the external surfaces of lower and upper panel members for a housing employed in the air breathing direct methanol fuel cell pack according to the present invention.
Figure 9:
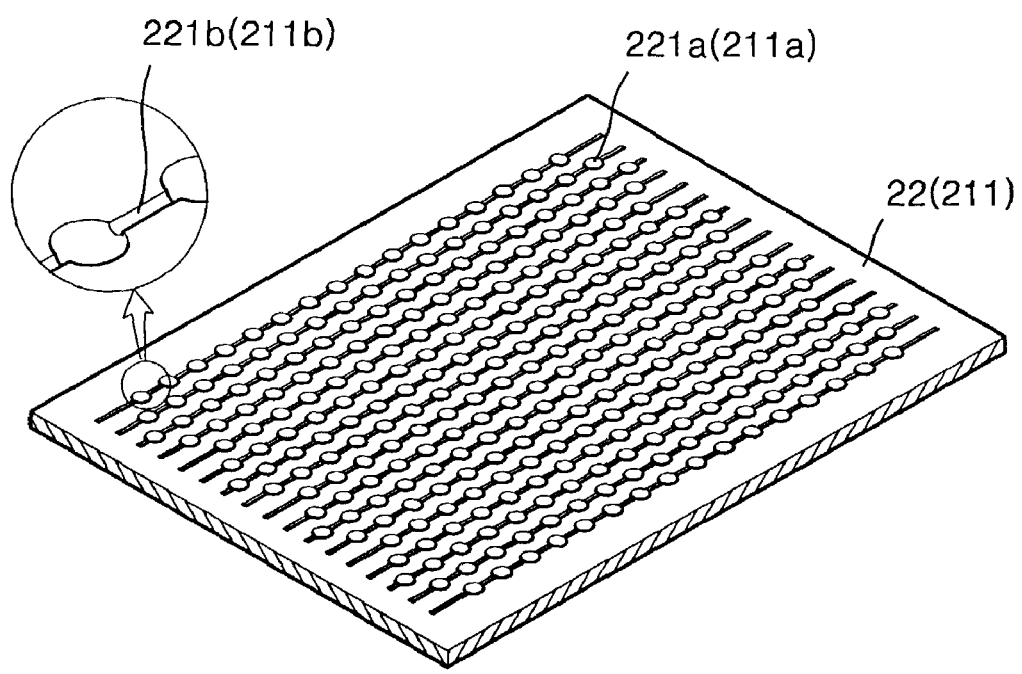
FIG. 9 is a perspective view illustrating the internal surfaces of lower and upper panel members for a housing employed in the air breathing direct methanol fuel cell pack according to the present invention.

FIG. 8 is a partially exploded perspective view illustrating the external surfaces of lower and upper panel members 211 and 22, respectively, having the air vent holes 211*a* and 221*a*, respectively, and FIG. 9 is a perspective view illustrating the internal surfaces of lower and upper panel members 211 and 22, respectively, having air channels 211*b* and 221*b*, respectively. As shown in FIGS. 8 and 9, the plurality of air vent holes 221*a* are formed at the upper panel member 22 and are connected to the air channels 221*b* having a predetermined depth, the air channels 221*b* formed at the internal surface of the upper panel member 22 to form air distribution channels. When some of the air vent holes 221*a* and 211*a* are clogged or some of the air vent holes 221*a* and 211*a* are shielded by a user's hand or other obstacle, the air channels 221*b* allow the air induced from the rest unshielded air vent holes 221*a* and 211*a* to be distributed by mutually connecting the air vent holes 221*a* and/or 211*a* at the internal surfaces of the upper panel member 22 and/or the lower panel member 211, respectively.

The air channels 221*b* and 211*b* serving as air distribution channels are provided for preventing electrode reactions from not taking place due to interrupted air supply when the air vent holes 221*a* and 211*a* are shielded by a user's hand or other use surroundings. Installation of the air channels 221*b* and 211*b* allows all of the air vent holes 221*a* and 211*a* to be interconnected at the internal surfaces of the of the upper panel member 22 and/or the lower panel member 211, respectively, thereby effectively preventing electrode reactivity from deteriorating, which is because the air is supplied from the unshielded air vent holes 221*a* and 211*a* even when some of air vent holes 221*a* and 211*a* are clogged.

Figure 10:
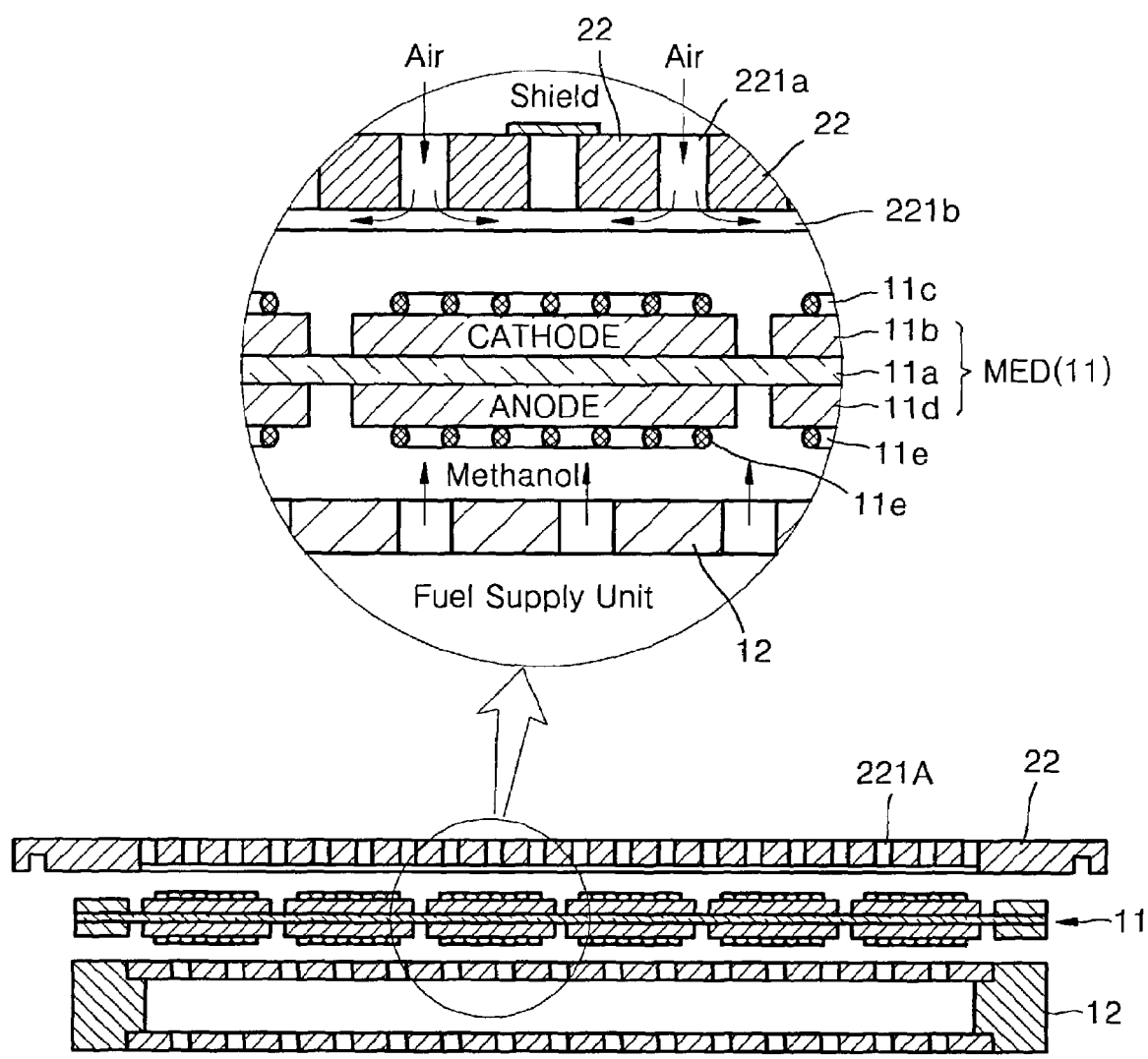
FIG. 10 is a cross-sectional development diagram illustrating the liquid fuel and air supply units of the air breathing direct methanol fuel cell pack according to the present invention.

FIG. 10 is a cross-sectional development diagram illustrating the stacked structure of the upper panel member 22, the MEAs 11, the fuel supply unit 12 and current collectors 11*c* and 11*e*, in which some of the air vent holes 221*a* and 211*a* are shielded. As shown in FIG. 10, when one or more air vent holes 221*a* and 211*a* are shielded at some portions of the upper panel member 22 and/or the lower panel member 211 (in FIG. 11, the central air vent hole being shielded), air is induced from the unshielded air vent hole(s) at both ends, and the induced air is distributed through the air channels 221*b* that mutually connect the air vent holes 221*a* and 211*a*. Thus, when some air vent holes 221*a* of the upper panel member 22 are shielded, air induced from the unshielded air vent holes 221*a* is distributed throughout the cathodes 11*b*. For brevity's sake, it has been described in FIG. 10 that one of three air vent holes 221*a* was shielded. However, in actual implementation, a plurality of the air vent holes 221*a* and/or 211*a* may be simultaneously shielded at an area.

As shown in FIG. 10, according to the present invention, the mesh-type current collectors 11*c* and 11*e* are provided on air and methanol supply paths. However, since the current collectors 11*c* and 11*e* are of a mesh type, they can entirely contact the respective electrodes and allow air and methanol to pass through the same to then be supplied to the cathode and anodes.

The air vent holes 221*a* and the air channels 221*b* formed at the upper panel member 22 shown in FIGS. 8 through 10 may be formed on the bottom of the lower body 21 (FIG. 1) of the cell pack according to the present invention, for example, the cell pack shown in FIG. 1. Also, in this case, like in the cell pack having the above-described structure, MEAs 11 are symmetrically provided at both sides of a single fuel supply unit 12. However, according to another embodiment of the present invention, the structure in which MEAs 11 are symmetrically provided at both sides of a single fuel supply unit 12, may be modified such that air vent holes 221*a* or 211*a* are formed at only an upper panel member 22 or a lower panel member 211, respectively.

Figure 11:
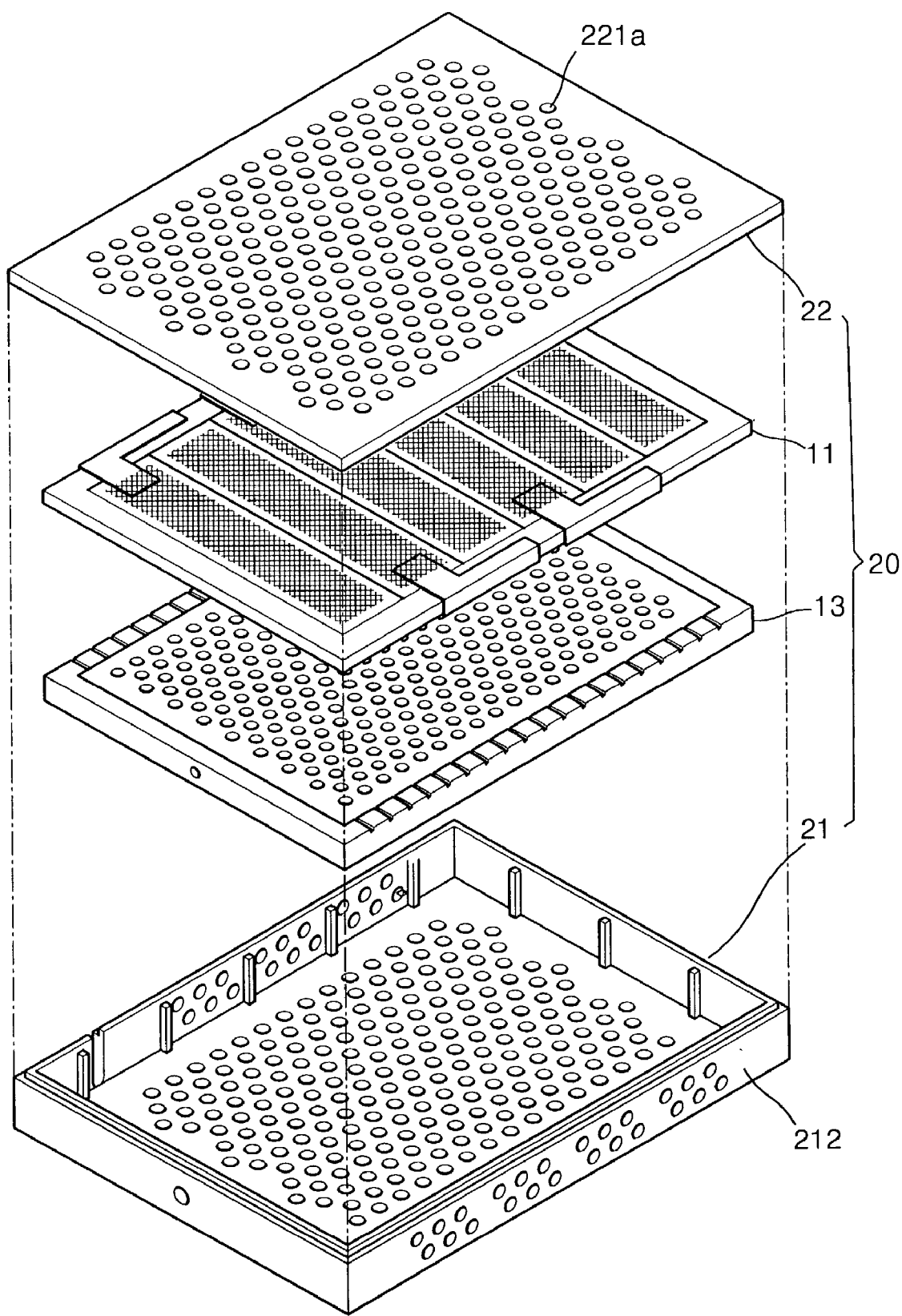
FIG. 11 is an exploded perspective view schematically illustrating an air breathing direct methanol fuel cell pack according to a second embodiment of the present invention.

FIG. 11 shows an air breathing direct methanol fuel cell pack according to a second embodiment of the present invention, in which air vent holes 221*a* are formed only at an upper panel member side. As shown in FIG. 11, a fuel supply unit 13 is disposed on the bottom of a box-shaped lower body 21 having a wall body 212 on the perimeter thereof, and an MEA 11 is positioned thereon. An upper panel member 22 is coupled to the lower body 21 in a state in which the MEA 11 is pressed. Anode and cathodes, and current collector plates corresponding to the respective electrodes, are provided in the MEA 11, although not labeled in FIG. 11 (best shown in FIG. 1). In the cell pack shown in FIG. 11, the configuration of the upper panel member 22 is the same as that shown in FIGS. 8 and 9.

In the above-described embodiments of the present invention, air vent holes 221*a* and/or 211*a* are provided in the upper panel member 22 and/or the lower panel member 211 of the lower body 21 and the air vent holes 221*a* and/or 211*a* are mutually connected by the air channels 221*b* and/or 211*b* shown in FIG. 9.

Figure 12:
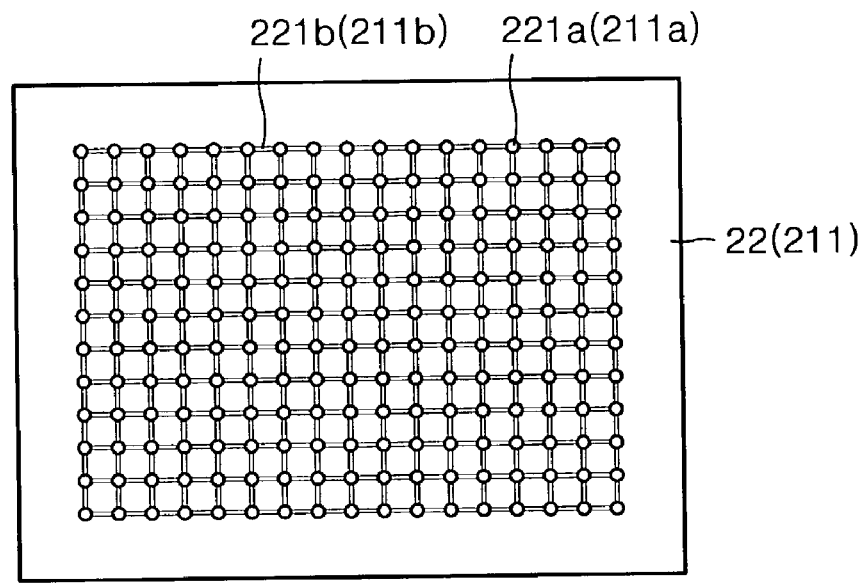
FIG. 12 is a plan view illustrating the internal surfaces of lower and upper panel members for a housing employed in the air breathing direct methanol fuel cell pack shown in FIG. 11.

FIG. 12 is a plan view illustrating another version of air channels 221*b* and/or 211*b* are formed at the internal surfaces of the upper panel member 22 and/or the lower panel member 211 of the lower body 21. As compared with the structure shown in FIG. 9, the air channels 221*b* and/or 211*b* shown in FIG. 12 may be checkered for more effective distribution of air. Formation of checkered air channels 221*b* and/or 211*b* allows more effective distribution of air, thereby promoting effective generation of electricity.

Figure 13:
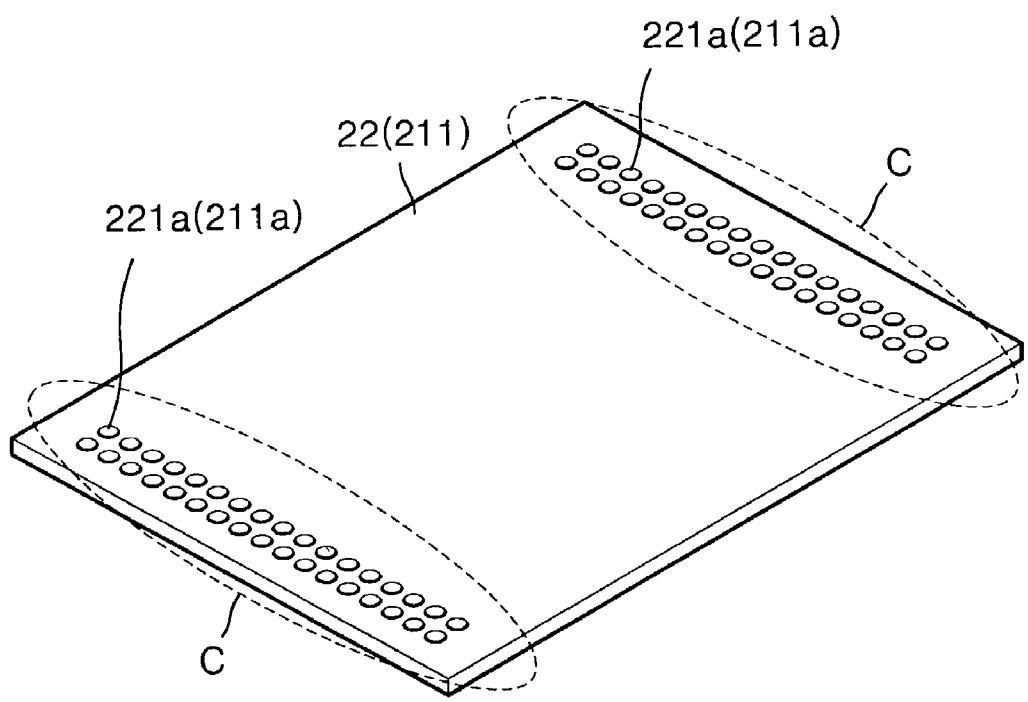
FIG. 13 is an exploded perspective view schematically illustrating the external surfaces of an air breathing direct methanol fuel cell pack according to a third embodiment of the present invention.

According to still another embodiment of the invention, the air vent holes 221*a* and 211*a* may not be formed on the entire surfaces of the upper panel member 22 and/or the lower panel member 211, but may be formed only at opposite edge areas C thereof as shown in FIG. 13.

Figure 14:
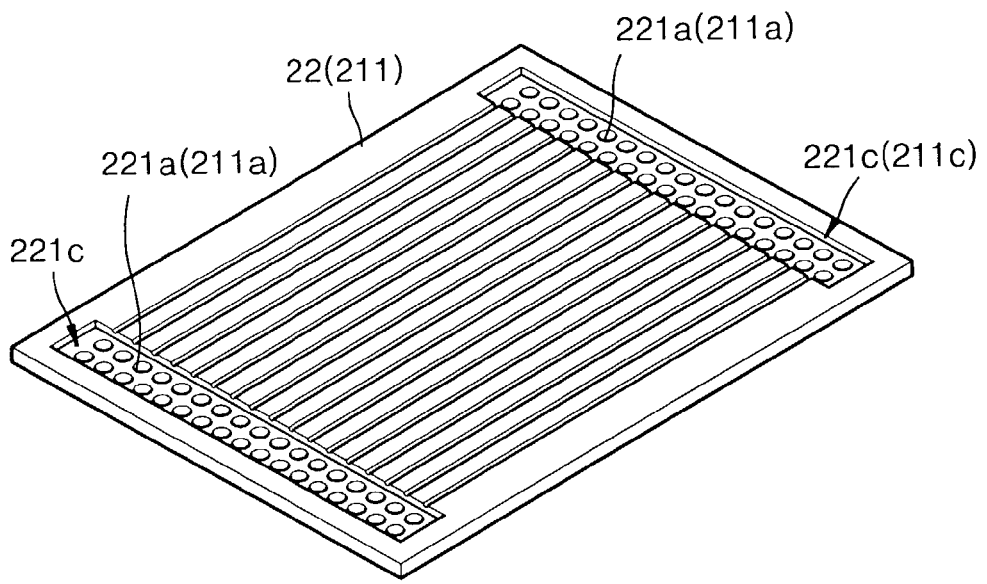
FIG. 14 is a perspective view illustrating the internal surfaces of the lower and upper panel members shown in FIG. 13.
Figure 15:
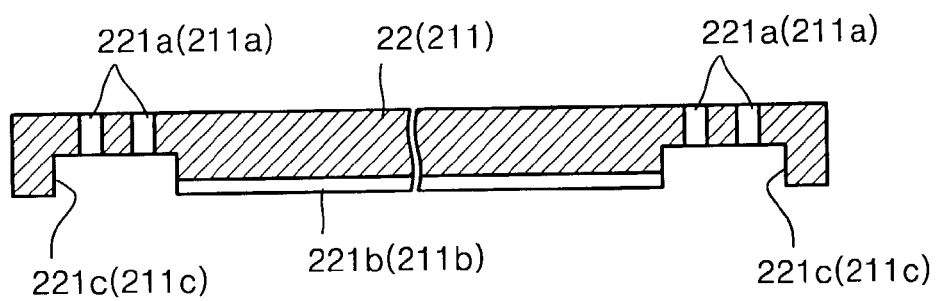
FIG. 15 is a horizontally sectional view schematically illustrating the lower and upper panel members shown in FIG. 13.

Also, as shown in FIGS. 14 and 15, air channels 221b and/or 211b may be formed on the entire internal surfaces of the upper panel member 22 and/or the lower panel member 211. The air channels 221b and/or 211b extend from one edge area C where the air vent holes 221a and/or 211a are formed to the other edge area C. In this case, cavities 221c and 211c having a predetermined depth are preferably formed at the internal surfaces of the edge areas C and connect the air vent holes 221a and 211a formed thereat, respectively.

Figure 16:
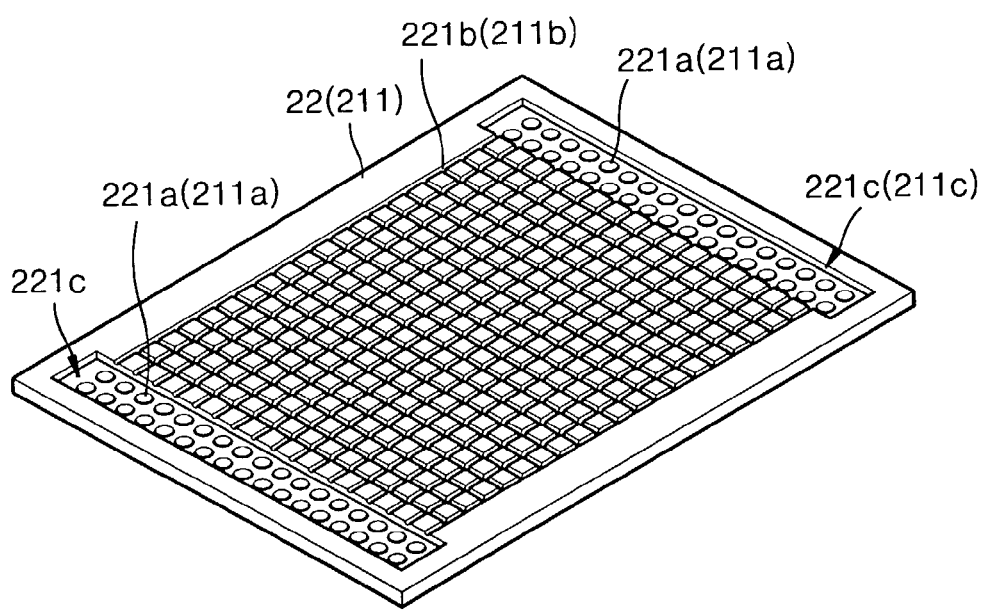
FIG. 16 is a perspective view illustrating the external surfaces of the upper panel member and/or the lower panel member employed in the air breathing direct methanol fuel cell pack shown in FIG. 13, each having a checkered air channel.

FIG. 16 shows alternative versions of the upper panel member 22 and/or the lower panel members 211 shown in FIGS. 14 and 15. In this embodiment, checkered air channels 221b and 211b are mutually connected, like in FIG. 12.

In the above-described embodiments, air channels 221b and/or 211b for air distribution are formed at the internal surfaces of the upper panel member 22 and/or the lower panel member 211, respectively, the air channels 221b and/or 211b being formed in a furrow or check pattern.

The function of air distribution using the air channels 221b and 211b mutually connected at the internal surfaces of the upper panel member 22 and/or the lower panel member 211, and a means for preventing infiltration of foreign matter or moisture which may be induced through air vent holes, will now be described.

Figure 17:
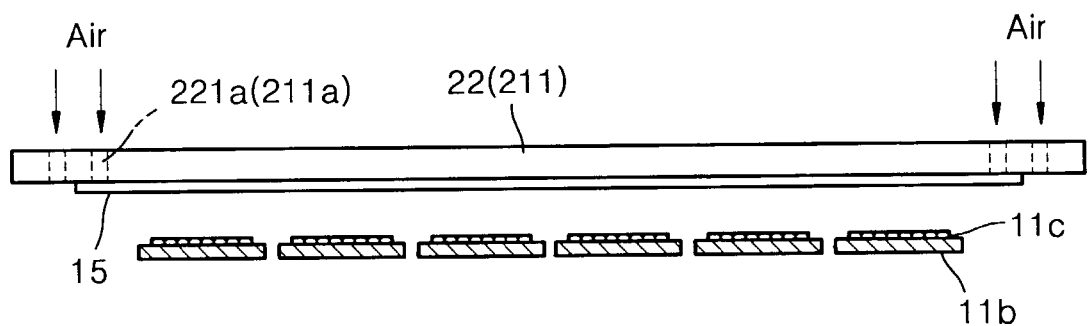
FIG. 17 is a cross-sectional view schematically illustrating another version of the air breathing direct methanol fuel cell pack according to the present invention, which is provided with a means for preventing infiltration of external moisture and to which the upper panel member shown in FIGS. 13 and 14 is employed.
Figure 18:
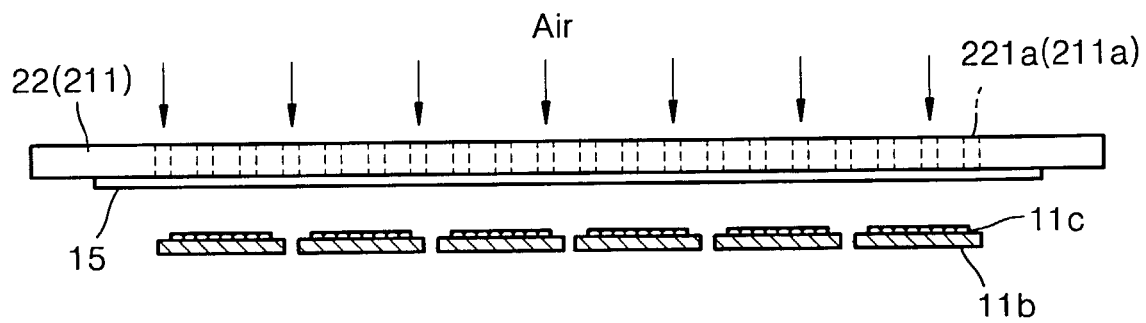
FIG. 18 is a cross-sectional view schematically illustrating another version of the air breathing direct methanol fuel cell pack according to the present invention, which is provided with a means for preventing infiltration of external moisture and to which the upper panel member shown in FIGS. 8 and 9 is employed.

As shown in FIGS. 17 and 18, a porous membrane 15, made of TEFLON®, through which air can be communicated but moisture cannot pass, is interposed between the MEA 11 and the upper panel member 22. The porous TEFLON® membrane prevents passage of moisture while allowing communication of air. Thus, the moisture induced through the air vent holes 221a cannot be induced into the cell pack, but the air can be induced into the cell pack.

Figure 19:
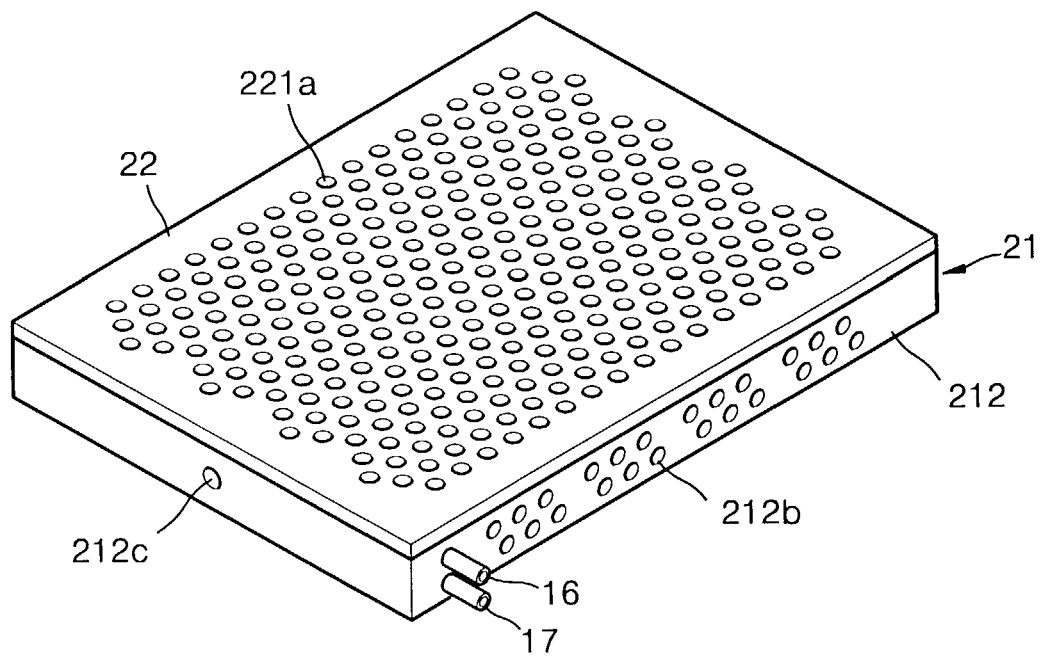
FIG. 19 is a perspective view schematically illustrating the assembled state of the air breathing direct methanol fuel cell pack shown in FIG. 1.
Figure 20:
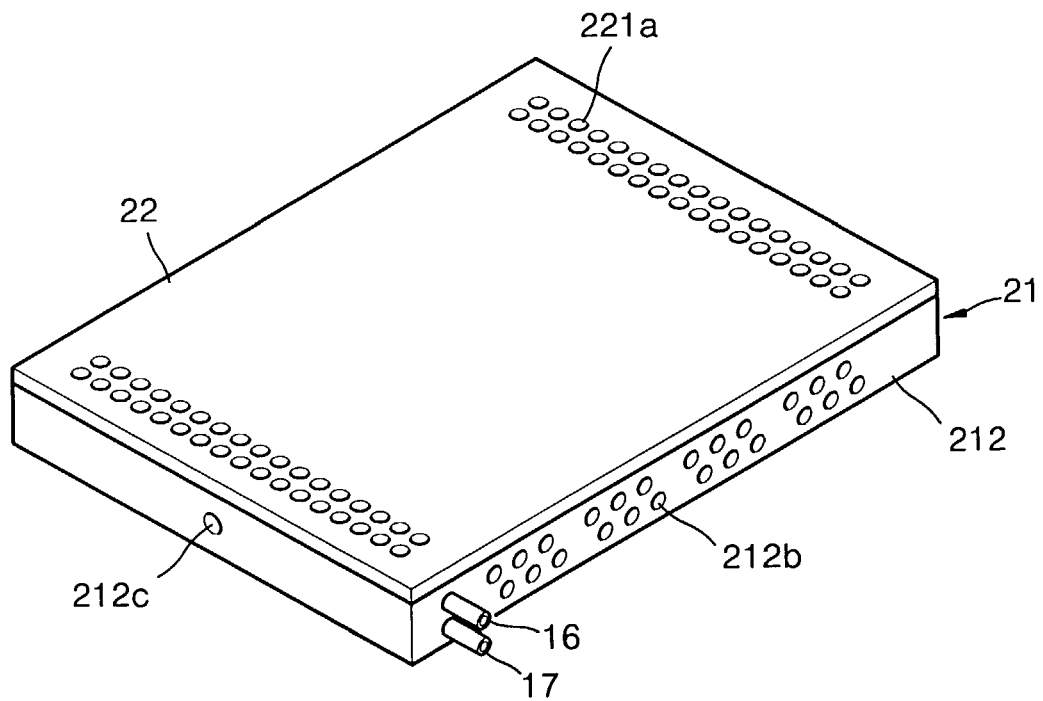
FIG. 20 is a perspective view schematically illustrating the assembled state of the air breathing direct methanol fuel cell pack shown in FIG. 17.

FIG. 19 is a perspective view schematically illustrating the assembled state of the air breathing direct methanol fuel cell pack shown in FIG. 1, and FIG. 20 is a perspective view schematically illustrating the assembled state of the air breathing direct methanol fuel cell pack shown in FIG. 17. Both of the cell packs shown in FIGS. 19 and 20 have a dimension of 6.0×8.0×1.0 (breadth/length/thickness) in centimeters. Air vent holes 221a and 211a for external air supply are arranged at the upper and lower panel members 22 and 211, respectively, at constant intervals. Gas exhaust holes 212b for exhausting carbon dioxide gas which is one of reaction byproducts are formed on the internal surface of a wall body 212. Terminals 16 and 17 serially connected with 12 unit cells provided at two MEAs 11 symmetrically disposed inside each cell pack are installed at one lateral surface of each cell pack.

A. Fabrication of Electrodes

An anode was fabricated by squeeze-coating a slurry prepared by mixing carbon black, isopropyl alcohol (IPA) and polytetrafluoroethylene (PTFE) onto porous carbon paper to form a fuel diffusion layer, the carbon paper not being treated with water-repellent process for promoting smooth supply of liquid fuel, and then drying the fuel diffusion layer at an oven maintained at a temperature of approximately 120° C. for 2 hours. To impart a viscosity suitable for squeeze-coating to the slurry, the content of PTFE was adjusted to approximately 10%. A catalyst layer was fabricated by squeeze-coating a slurry prepared by mixing PtRu black (produced by Johnson Matthey Co.) as a catalyst, water, IPA and 5% Nafion solution (produced by Aldrich Chemical Co.) onto the fuel diffusion layer using an ultrasonic mixer for 2 hours. The Nafion solution was used in an amount of 15% by weight based on the weight of PtRu black. The catalyst was loaded into an electrode in an amount of 11 mg/cm$^2$. The fabricated electrode was dried at a vacuum oven maintained at a temperature of approximately 80° C. for approximately one hour to remove IPA from the electrode.

A cathode was fabricated by squeeze-coating a slurry prepared by mixing carbon black, IPA and PTFE onto porous carbon paper to form a fuel diffusion layer, the carbon paper being treated with water-repellent process for promoting smooth supply of oxygen and effective exhaustion of water and carbon dioxide, and then drying the fuel diffusion layer at an oven maintained at a temperature of approximately 120° C. for 2 hours. To impart a viscosity suitable for squeeze-coating to the slurry, the content of PTFE was adjusted to approximately 10%. A catalyst layer was fabricated by squeeze-coating a slurry prepared by mixing Pt black (produced by Johnson Matthey Co.) as a catalyst, water, IPA and 5% Nafion solution (produced by Aldrich Chemical Co.) onto the fuel diffusion layer using an ultrasonic mixer for 2 hours. The Nafion solution was used in an amount of 15% by weight based on the weight of Pt black. The catalyst loading was about 10 mg/cm$^2$. The fabricated electrode was dried at a vacuum oven maintained at a temperature of approximately 80° C. for approximately one hour to remove IPA from the electrode.

B. Fabrication of MEA for Cell Pack

A 127 µm thick Nafion 115 membrane (produced by DuPont Co.) was used as an electrolyte membrane. For removing impurities, the membrane was pretreated with $H_2SO_4$ and $H_2O_2$, followed by drying at a gel-dryer. The anode and the cathode were cut into a size of 4.5 cm$^2$, and each 6 sheets of electrodes were arranged on both surfaces of the electrolyte membrane and hot-pressed at 125° C. under a pressure of 9 metric tons for 5 minutes, thereby fabricating a 6-cell MEA.

C. Fabrication of Cell Pack

In the fabricated 6-cell MEA, the respective cells were connected to each other in series by current collectors formed of nickel mesh having a size equal to or slightly smaller than an electrode (slightly smaller in the above-described embodiments). The nickel mesh was plated with gold for the purpose of preventing corrosion due to methanol. The respective nickel meshes were connected to each other by ultrasonic welding machine using a conductor made of a copper foil.

The cell pack is constituted by an upper panel member, a lower panel member and a fuel supply (or storage) unit) and 6-cell MEAs connected by current collectors in series are symmetrically arranged at both sides of the fuel supply unit.

Methanol fuel is supplied to an anode by a capillary force and external atmospheric oxygen is supplied to a cathode through air vent holes formed at the upper and lower panel members of the cell pack. The cell pack according to the present invention operates in an air breathing type at room temperature and atmospheric pressure.

Figure 21:
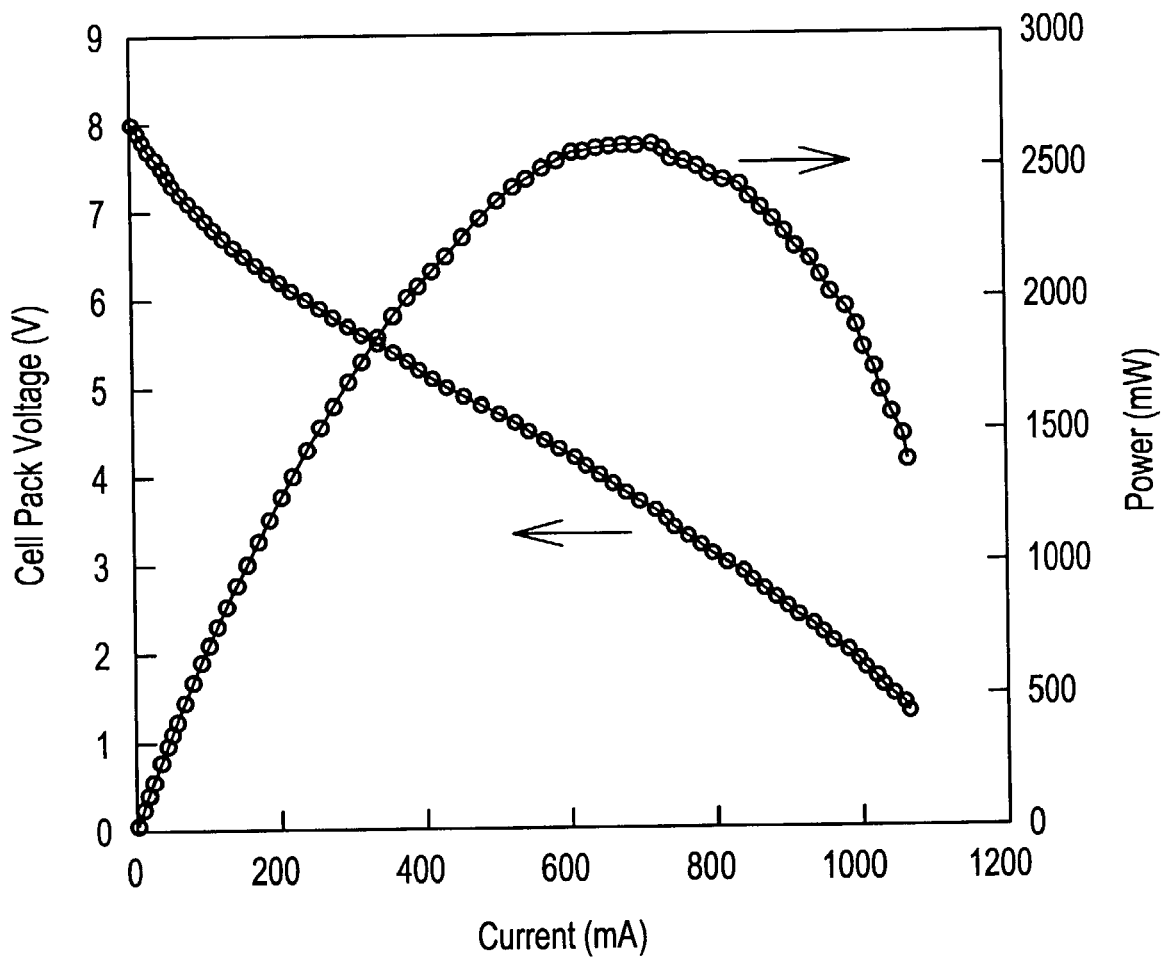
FIG. 21 is a graphical representation illustrating the performance of a cell pack according to the present invention.

FIG. 21 is a graphical representation illustrating the performance curve of a cell pack according to the present invention. The cell pack is configured such that 12 sheets of electrodes each having an area of 4.5 cm$^2$ are connected to each other in series. After 5 M methanol was injected into a fuel inlet port of the cell pack, the cell pack was tested under room temperature, air breathing conditions. The cell pack showed the performance of 717 mA (159 mA/cm$^2$) at 3.6 V, and exhibited the maximum power of 2607 mW (48 mW/cm$^2$) at 3.64 V.

In the conventional cell pack, current collectors contact some parts of anode and cathodes and the other parts of the electrodes contact a fuel supply unit, that is, a contact area between the current collectors and the electrodes is small, resulting in an increase in contact resistance, and fuel is not supplied to parts contacting the current collectors, resulting in performance deterioration. On the other hand, since current collectors according to the present invention are of a mesh type, current collection from all parts of electrodes is allowed while supplying fuel. Also, according to the present invention, for effective air breathing, particularly for supplying air to entire electrodes, air channels are formed at the respective internal surfaces of upper and lower panel members contacting cathodes of MEAs. Thus, even if air supply is interrupted at some portions shielded by a user's hand or other obstacles, air can be supplied from unshielded portions. In other words, air vent holes and air channels of the cell pack according to the present invention allow external air induced into the cell pack to be supplied to electrode surfaces by convection, irrespective of a connected area between the cell pack and an electronic device or use surroundings of the electronic device. Further, since a porous TEFLON® membrane for air passage is interposed between the upper panel member and/or the lower panel member, induction of external foreign matter or moisture can be effectively prevented.

What is claimed is:

1. An air breathing direct fuel cell pack comprising:
    a membrane electrode assembly (MEA) comprising a plurality of single cells including an electrolyte membrane, anodes on a first plane of the electrolyte membrane and cathodes on a second plane of the electrolyte membrane, the second plane disposed opposite to the first plane;
    a fuel supply unit facing the first plane of the MEA, the fuel supply unit supplies liquid fuel to the anodes on the first plane of the MEA;
    an upper panel member facing the second plane of the MEA and comprising:
    a first cavity formed in an internal surface of the upper panel member and disposed at a first side thereof;
    a second cavity formed in the internal surface of the upper panel member and disposed at a second side opposite the first side;
    a plurality of air vent holes formed in at least one of the first cavity and the second cavity and through which air passes from an ambient environment directly into the at least one of the first cavity and the second cavity; and
    air channels connecting the first cavity to the second cavity, wherein air vent holes of the plurality of air vent holes comprise through-holes in the upper panel member which are formed from one face of the upper panel member through to an opposite face of the upper panel member;
    current collectors disposed on the cathode and the anode of single cells of the plurality of single cells in the MEA;
    conductors electrically connecting the current collectors to form electric circuitry among the single cells; and
    a lower panel member for forming a housing for accommodating the MEA and the fuel supply unit in cooperation with the upper panel member.

2. The air breathing direct fuel cell pack according to claim 1, wherein the air channels are formed in a parallel furrow pattern, wherein the parallel furrow pattern comprises parallel trenches which intersect the air vent holes.

3. The air breathing direct fuel cell pack according to claim 2, wherein the air vent holes are formed in both the first cavity and the second cavity.

4. The air breathing direct fuel cell pack according to claim 3, wherein
    the first cavity and the second cavity are formed in an internal surfaces of the upper panel member at the first side and the second side, respectively,
    each of the first cavity and the second cavity connects the air vent holes within a given one of the first cavity and the second cavity, respectively, and
    the air channels are formed in the internal surface of a center portion of the upper panel member to transport air from the first cavity to the second cavity.

5. The air breathing direct fuel cell pack according to claim 1, wherein the air channels are formed in a crossing check pattern, wherein the crossing check pattern comprises furrows which intersect and cross at the air vent holes.

6. The air breathing direct fuel cell pack according to claim 5, wherein the air vent holes are formed in both the first cavity and the second cavity.

7. The air breathing direct fuel cell pack according to claim 6, wherein
    the first cavity and the second cavity are formed in an internal surface of the upper panel member at the first side and the second side, respectively,
    each of the first cavity and the second cavity connects the air vent holes within a given one of the first cavity and the second cavity, respectively, and
    the air channels are formed in the internal surface of a center portion of the upper panel member to transport air from the first cavity to the second cavity.

8. The air breathing direct fuel cell pack according to claim 1, wherein the first cavity and the second cavity of the upper panel member are disposed at two opposite areas separate from each other about a center portion of the upper panel member, the air channels are disposed along a direction between the first cavity and the second cavity, the first cavity is connected to the second cavity and the center portion of the upper panel member is through-hole free.

9. The air breathing direct fuel cell pack according to claim 8, wherein each of the first cavity and the second cavity connects the air vent holes within a given one of the first cavity and the second cavity, respectively, and the air channels are formed in an internal surface of a center portion of the upper panel member to transport air from the first cavity to the second cavity.

10. The air breathing direct fuel cell pack according to claim 1, wherein the air vent holes comprise round tubular apertures which extend from at least one of the air channels to an upper surface of the upper panel member.

11. The air breathing direct fuel cell pack according to claim 1, wherein the air vent holes formed in the at least one of the first cavity and the second cavity allow air from of the air vent holes to mix within the at least one of the first cavity and the second cavity from the ambient environment regardless of whether one or more of the air vent holes are shielded from the ambient environment.

12. The air breathing direct fuel cell pack according to claim 1, wherein a number of the air vent holes is greater than a number of the air channels.

13. The air breathing direct fuel cell pack according to claim 1, wherein the air channels are disposed along two different directions along a plane defined by the upper panel member to connect the air vent holes.

14. The air breathing direct fuel cell pack according to claim 1, wherein the air channels are disposed on the internal surface of the upper panel member between an upper portion of the upper panel member and the current collectors.

15. The air breathing direct fuel cell pack according to claim 1, further comprising a membrane disposed between the upper panel member and the MEA for preventing infiltration of external moisture.

16. The air breathing direct fuel cell pack according to claim 1, further comprising a membrane disposed between the air vent holes in the upper panel member and the current collectors of the MEA for preventing infiltration of external moisture.

17. The air breathing direct fuel cell pack according to claim 1, further comprising a membrane disposed between the air channels in the upper panel member and the current collectors of the MEA for preventing infiltration of external moisture.

18. The air breathing direct fuel cell pack according to claim 1, wherein the current collectors comprise a metal mesh which allows passage of air and liquid fuel therethrough.

19. The air breathing direct fuel cell pack according to claim 18, wherein the metal mesh comprises one of a nickel mesh and a gold plated nickel mesh.

20. The air breathing direct fuel cell pack according to claim 18, wherein the current collectors further comprise a plurality of the metal meshes, the metal meshes of the plurality of metal meshes are connected to each other by a conductor.

21. The air breathing direct fuel cell pack according to claim 20, wherein the conductor comprises copper foil.

22. The air breathing direct fuel cell pack according to claim 18, wherein a size of the metal mesh is less than or equal to a size of one of the anodes and the cathodes of the MEA.

23. The air breathing direct fuel cell pack according to claim 18, wherein the air channels connect the air vent holes in at least two in-plane directions of the upper panel member.

24. An air breathing direct methanol fuel cell pack comprising: a fuel supply unit in which liquid fuel is accommodated and including fuel supply plates disposed at opposite sides thereof to allow the liquid fuel to pass through the fuel supply unit; a set of membrane electrode assemblies (MEAs) provided at two sides of the fuel supply unit and comprising a plurality of single cells including an electrolyte membrane, anodes disposed on an internal surface of the electrolyte membrane, the internal surface facing the fuel supply unit, and cathodes disposed on an external surface of the electrolyte membrane; current collectors disposed on the cathode and the anode of single cells of the plurality of single cells in the MEAs; conductors electrically connecting the current collectors to form electric circuitry among the single cells; an upper panel member and a lower panel members facing external surfaces of respective MEAs of the set of MEAs and each including a plurality of air vent holes through which air communicates with an ambient environment, the upper panel member and the lower panel member defining a housing for accommodating at least the MEAs and the fuel supply unit; air channels for mutually connecting inner parts of air vent holes of the plurality of air vent holes formed in the internal surfaces of at least one of the upper panel member and the lower panel member, wherein the air vent holes are throughbore holes; a first cavity formed in an internal surface of the upper panel member and disposed at a first side thereof; and a second cavity formed in the internal surface of the upper panel member and disposed at a second side opposite the first side, wherein the first cavity and the second cavity of the upper panel member are disposed at two opposite areas separate from each other about a center portion of the upper panel member, the air vent holes are formed in at least one of the first cavity and the second cavity, the air channels are disposed along a direction between the first cavity and the second cavity, the first cavity is connected to the second cavity, and the center portion of the upper panel member is throughhole free.

25. The air breathing direct methanol fuel cell pack according to claim 24, wherein the air channels are formed in a parallel furrow pattern, wherein the parallel furrow pattern comprises parallel trenches which intersect the air vent holes.

26. The air breathing direct methanol fuel cell pack according to claim 24, wherein the air channels are formed in a crossing check pattern, wherein the crossing check pattern comprises furrows which intersect and cross at the air vent holes.

27. The air breathing direct methanol fuel cell pack according to claim 24, wherein the air vent holes are formed in both the first cavity and the second cavity, and the air channels are formed in an internal surface of a center portion of the upper panel member to transport air from the first cavity to the second cavity in one of a furrow pattern and a check pattern.

28. The air breathing direct methanol fuel cell pack according to claim 24, wherein the air vent holes comprise round tubular apertures which extend from at least one of the air channels to an upper surface of the upper panel member.

29. The air breathing direct methanol fuel cell pack according to claim 24, wherein the air vent holes formed in the at least one of the first cavity and the second cavity allow air from the air vent holes to mix within the at least at least one of the first cavity and the second cavity from the ambient environment regardless of whether one or more of the air vent holes are shielded from the ambient environment.

30. The air breathing direct methanol fuel cell pack according to claim 24, wherein the air channels are disposed along two different directions along a plane defined by the upper panel member to connect the air vent holes.

31. The air breathing direct methanol fuel cell pack according to claim 24, wherein the air channels are disposed on the internal surface of the upper panel member between an upper portion of the upper panel member and the current collectors.

32. The air breathing direct methanol fuel cell pack according to claim 24, further comprising a membrane disposed between the air vent holes in the upper panel member and the current collectors for preventing infiltration of external moisture.

33. The air breathing direct methanol fuel cell pack according to claim 24, wherein the current collectors comprise a metal mesh which allows passage of air and liquid fuel therethrough.

34. The air breathing direct methanol fuel cell pack according to claim 33, wherein the metal mesh comprises one of a nickel mesh and a gold plated nickel mesh.

35. The air breathing direct methanol fuel cell pack according to claim 24, wherein a number of the air channels is less than a number of the air vent holes.

36. The air breathing direct methanol fuel cell pack according to claim 24, further comprising a membrane disposed between the air channels in the upper panel member and the current collectors for preventing infiltration of external moisture.

37. The air breathing direct methanol fuel cell pack according to claim 24, wherein the current collectors each comprise metal meshes connected to each other with a conductor.

38. The air breathing direct methanol fuel cell pack according to claim 37, wherein the conductor comprises copper foil.

39. The air breathing direct methanol fuel cell pack according to claim 24, wherein a size of the current collectors is less than or equal to a size of one of the anodes and the cathodes.

40. The air breathing direct fuel cell pack according to claim 24, wherein the air channels are disposed along two different directions along a plane defined by the upper panel member to connect the air vent holes.

41. The air breathing direct methanol fuel cell pack according to claim 24, wherein the current collectors comprise metal meshes connected to each other by a conductor, the conductor comprises copper foil, and a size of the current collectors is equal to or less than a size of one of the anodes and the cathodes in at least one MEA of the set of MEAs.

* * * * *